Aug. 5, 1969   N. N. FENDER   3,459,065
PARKING BRAKE ACTUATOR AND CONTROL MECHANISM
Filed Sept. 25, 1967   3 Sheets-Sheet 2
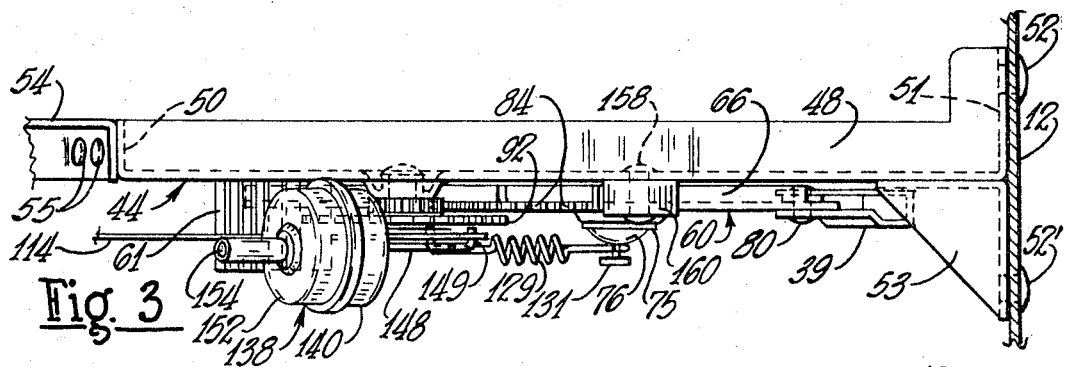
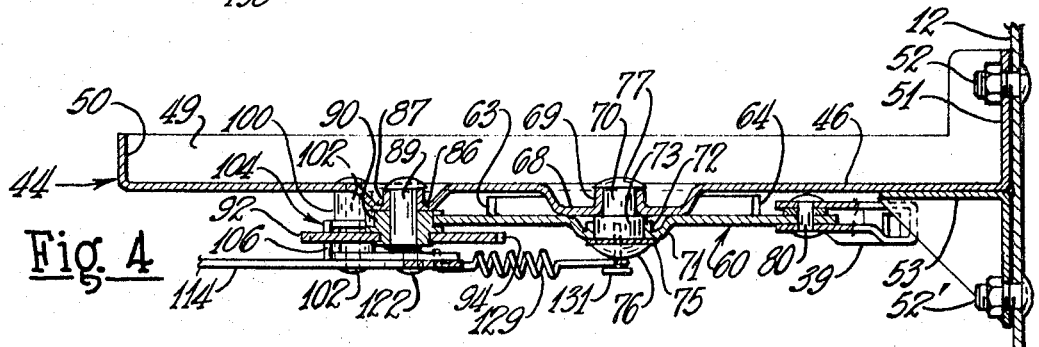
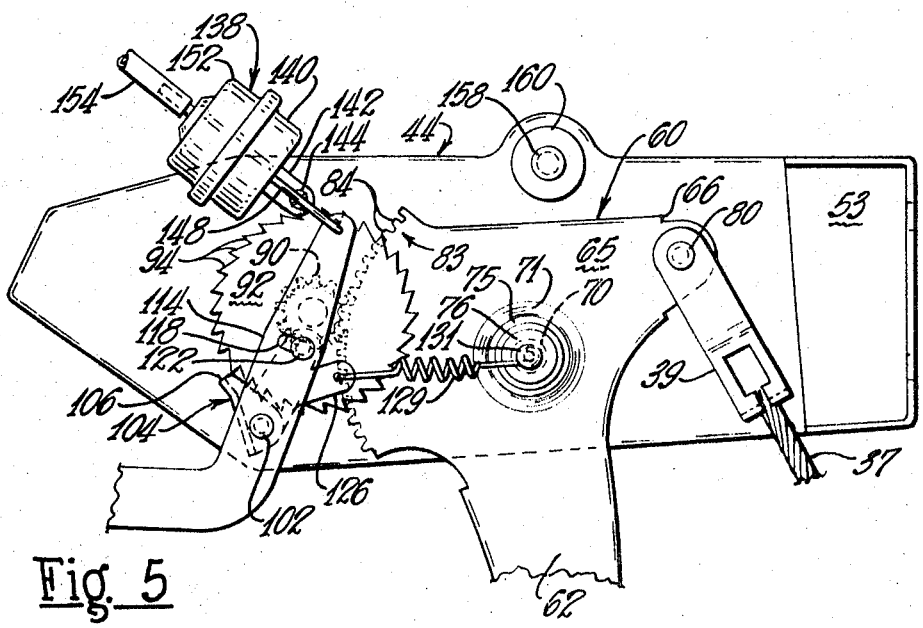
INVENTOR.
NORMAN N. FENDER
BY
Harry C. Ernsberger
ATTORNEY Aug. 5, 1969 N. N. FENDER 3,459,065
PARKING BRAKE ACTUATOR AND CONTROL MECHANISM
Filed Sept. 25, 1967 3 Sheets-Sheet 3
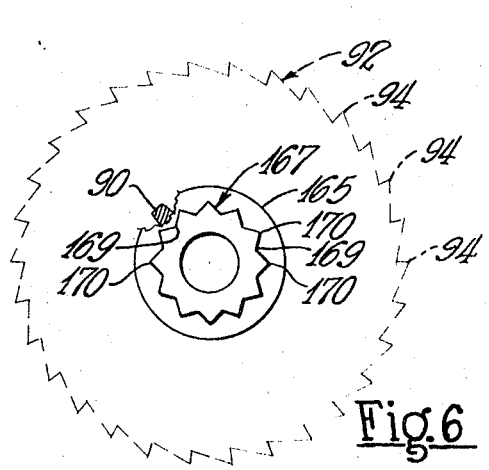
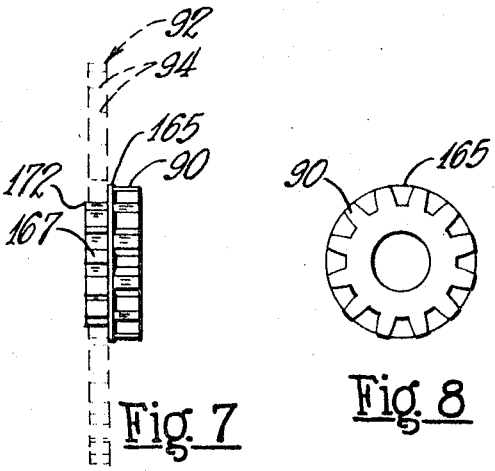
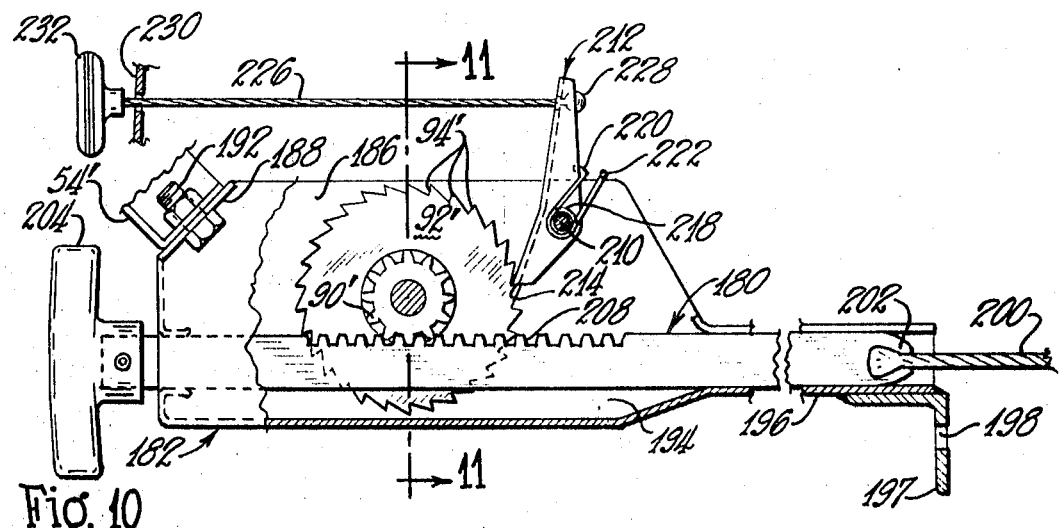
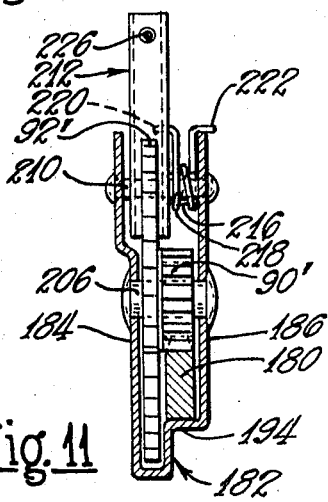
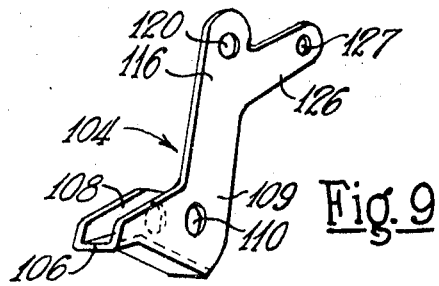
INVENTOR.
NORMAN N. FENDER
BY
Harry O. Ernsberger
ATTORNEY

# United States Patent Office 3,459,065
Patented Aug. 5, 1969

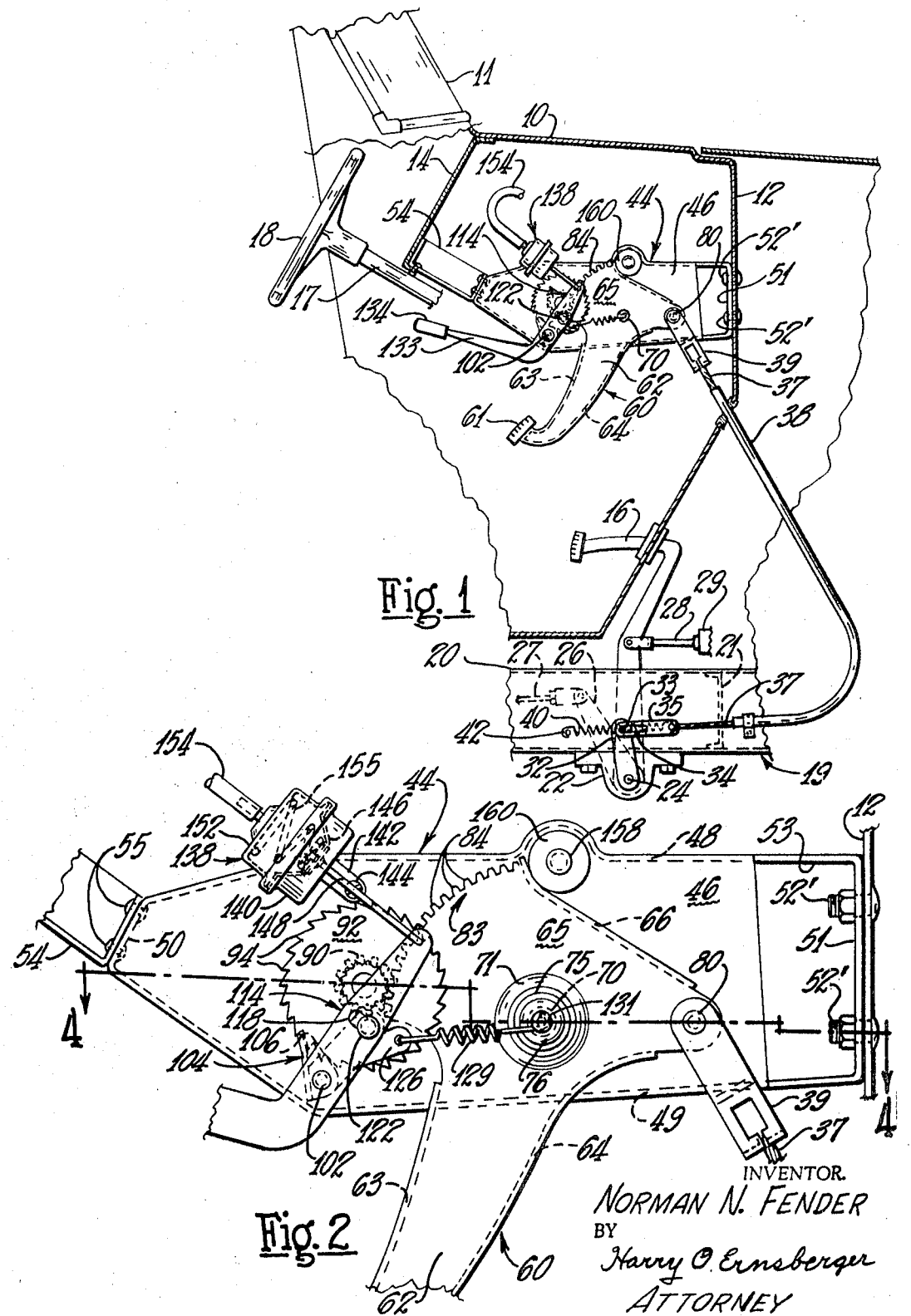

3,459,065
PARKING BRAKE ACTUATOR AND CONTROL MECHANISM
Norman N. Fender, Erie, Mich., assignor, by mesne assignments, to Universal American Corporation, New York, N.Y., a corporation of Delaware (formerly Robfre Manufacturing Corporation)
Filed Sept. 25, 1967, Ser. No. 670,062
Int. Cl. G05g 5/06, 1/14; B60t 17/00
U.S. Cl. 74—529
8 Claims

ABSTRACT OF THE DISCLOSURE

This invention relates to parking brake actuator and control mechanism wherein a foot-operated or manually operated brake actuator is held in brake-setting position by pawl or detent means engageable with a rotatable ratchet member wherein a motion multiplying arrangement between the actuator and ratchet member is effective to transmit movement of the brake actuator to the rotatable ratchet member whereby the parking brakes may be held securely in a set position substantially eliminating cable "back-off" and the pawl means easily manipulated to effect release of the actuator and the parking brakes.

---

This invention relates to parking brake actuator and control mechanism and more especially to a mechanism of this character associated with means for locking the actuator and parking brakes in brake-set position and the locking means easily released with little effort to effect release of the parking brakes.

Various types of foot-operated and manually operated mechanisms and devices have been developed and used for actuating and controlling the parking brakes of automotive vehicles. Such mechanisms have involved the use of a brake actuating foot-operated lever or pull member in conjunction with means or devices for holding the actuator lever or member and parking brakes in brake setting positions. Pawl mechanisms have been used engaging a toothed sector on a foot-operated actuator or engaging teeth on a pull member for holding the brakes in set position. Heretofore the pawl means has been arranged for direct engagement with teeth on a foot-operated actuator or with teeth on a pull rod member. Difficulties have been encountered with these types of mechanisms in that a toothed rack and pawl means provides only stepped increments, equal to the spaces between adjacent teeth, for holding the parking brakes in set position. In many instances the actuator holding means may be ineffective to properly hold the brakes in a set position because of failure of registration of a pawl with a ratchet tooth on the actuator so that cable "back-off" occurs, that is, the actuator retracts in a brake release direction until the pawl registers with one of the ratchet teeth. While devices of this character have in the past been used extensively, the trend in brake design is to substantially increase brake pressures, rendering the actuator brake-setting position more critical and requiring increased effort or force to release the pawl.

One form of actuator and control mechanism for overcoming the difficulties of pawl and ratchet mechanisms involves the use of a drum of a small diameter rotated by a toothed sector on a foot-operated actuator, the teeth meshing with teeth of a pinion on the drum with a coiled element embracing the drum for holding the parking brakes and actuator in brake-setting position. This type of parking brake control mechanism is disclosed in my Patent 3,236,120. The arrangement shown in my patent is efficient and effective in holding parking brakes in brake setting positions and is being used as standard equipment on vehicles produced by some manufacturers at the present time, but the construction is relatively expensive, a factor which has impeded more extensive use of the construction.

The present invention embraces a mechanism or arrangement wherein movement of the brake actuator is operable through a motion multiplying media or instrumentality to effect amplified movement of a ratchet member of a pawl and ratchet mechanism wherein the parking brakes may be effectively held in set position and cable "back-off" substantially eliminated.

Another object of the invention resides in a parking brake actuator mechanism wherein movement of the actuator is transmitted to a rotatable toothed member associated with a cooperating pawl by a motion multiplying media wherein the pawl is subjected to greatly reduced thrust or stress in retaining the parking brakes in set position and wherein the pawl may be easily manually released with little effort on the part of the operator or the pawl released by a comparatively small servo-motor power device.

Another object of the invention resides in the provision of a motion multiplying arrangement between an actuator and a pawl-retained member which is effectively usable with a foot-operated parking brake actuator or with a manually operable pull-rod type actuator.

The further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a portion of an operator's compartment of a vehicle, with certain portions broken away, illustrating one form of parking brake control mechanism of the invention;

FIGURE 2 is an enlarged side elevational view of the parking brake control mechanism illustrated in FIGURE 1;

FIGURE 3 is a top view of the arrangement shown in FIGURE 2;

FIGURE 4 is a sectional view taken substantially on the line 4—4 of FIGURE 2;

FIGURE 5 is a view similar ot FIGURE 2 illustrating the components in brake-setting position;

FIGURE 6 is an end view of a component of the invention;

FIGURE 7 is a side view of the construction shown in FIGURE 6;

FIGURE 8 is an end view of the portion of the construction shown in FIGURE 7;

FIGURE 9 is an isometric view illustrating a form of pawl means forming a component of the construction;

FIGURE 10 is an elevational view, partly in section, illustrating another form of brake actuator mechanism embodying the invention, and FIGURE 11 is a sectional view taken substantially on the line 11—11 of FIGURE 10.

Referring to the drawings in detail and initially to FIGURE 1, there is illustrated an installation of one form of the invention in the operator's compartment of a conventional automotive vehicle. The illustrated portion of the vehicle is inclusive of a cowl portion 10, a windshield or fire screen 11, a firewall or dashboard 12, an instrument panel 14, a service brake pedal lever 16, a steering post 17 and a steering wheel 18. The vehicle chassis frame 19 includes parallel side frame members 20, one of which is shown in FIGURE 1, joined by cross members or struts of conventional construction, one of the struts being illustrated at 21.

Secured to the side frame members 20 are brackets 22, one of which is shown in FIGURE 1, the brackets journally supporting a transversely extending shaft 24, the pedal 16 being mounted on the shaft 24.

Fixed upon the shaft 24 is an arm 26 connected by a rod 27 with the vehicle parking brakes (not shown) associated with road wheels (not shown) of the vehicle. The vehicle service brakes are operated by the service brake pedal 16 through a rod 28 operating a piston in a master cylinder 29 of a conventional hydraulic brake system.

Secured on the shaft 24 is an arm 32 provided at its distal end with a pin 33 arranged for traverse in a slot 34 provided in a link 35. The link is connected to the lower end of a flexible cable 37 enclosed in a tubular sheath 38, the other end of the cable 37 being equipped with a clevis 39 for connection with a parking brake actuating and controlling mechanism hereinafter described.

One end of a contractile spring 40 is connected with the link 35, the other end of the spring being anchored to a pin 42 carried by the side frame member 20. The spring 40 biases the link in a left-hand direction as viewed in FIGURE 1 toward parking brake release position.

The parking brake actuating and controlling mechanism is mounted on a support or support means 44 preferably fashioned of sheet metal having a body portion 46, upper and lower laterally-extending reinforcing flanges 48 and 49 and end flanges 50 and 51. The forward end flange 51 is secured to the firewall 12 by means of bolts 52, this end region of the support member 44 being equipped with a bracket 53 welded or otherwise secured to the body portion 46 of the support means, the bracket also being secured to the firewall by bolts 52'.

The flange 50 of the support means 44 is secured to a bracket 54 by rivets 55 or other securing means, the bracket being secured to the instrument panel 14 as shown in FIGURE 1.

The brake actuating or control mechanism includes a brake actuator, which in the embodiment illustrated in FIGURES 1 through 5, is a foot-operated lever or pedal member 60 having a foot pad portion 61. The actuator 60 is fashioned with a downwardly extending section 62 of U-shaped cross-section defined by laterally extending flanges 63 and 64 and a planar portion 65. The planar portion has a laterally extending reinforcing flange 66.

The body or web portion 46 of the support means is fashioned with a raised portion 68, shown in FIGURE 4, having a circular flange 69 defining an opening snugly receiving a pin 70, the latter providing a fulcrum or pivot for the actuator or foot-operated member 60. The planar portion 65 of the foot-operated lever 60 is fashioned with a raised portion 71 joined with a circular flange 72 as shown in FIGURE 4.

The pin 70 has an enlarged portion 73, the actuator or lever 60 being fulcrumed or pivoted on the enlarged portion 73 of the pin for movement about the axis of the pin as a fulcrum. A washer 75 is disposed between the head 76 of the pin 70, and the raised portion 71 of the actuator, as shown in FIGURE 4. After assembly of the lever and fulcrum pin 70 with the support means 44, the end of the pin is swaged or headed as at 77 to secure these components in assembled relation.

The clevis 39, anchored to the upper end of the cable 37, is pivotally connected with the portion 65 of the actuator or lever 60 by a pin or rivet 80 whereby pivotal movement of the actuator or lever 60 about the fulcrum pin 70, in a counterclockwise direction as viewed in FIGURES 1 and 2, moves the cable 37 upwardly, which movement transmitted through the link 35, arms 26 and 32 and rod 27 is effective to set the parking brakes of the vehicle.

The arrangement of the invention embodies means for holding or locking the actuator 60 in brake setting position, the components in the relation illustrated in FIGURE 5 being in brake-setting position. The planar or plate section 65 of the lever or actuator 60 has an arcuately shaped region 83 provided with a plurality of teeth 84 forming or constituting an arcuately shaped rack. The teeth 84 are disposed in an arc generated about the axis of the fulcrum pin 70.

As shown in FIGURE 4, the body portion 46 of the support means is fashioned with a raised portion 86 integral with a circular flange 87 which defines an opening in which is snugly fitted a stub shaft or pin 89. Journally mounted on the stub shaft 89 is a pinion 90. Secured to the pinion 90, in a manner hereinafter explained, is a generally circular ratchet disc or ratchet member 92, the periphery of which is fashioned with ratchet teeth 94, the diameter of the ratchet disc 92 being substantially larger than the pitch diameter of the pinion 90.

In the embodiment illustrated, the diameter of the ratchet disc 92 is substantially three times the pitch diameter of the pinion 90, this arrangement providing a motion multiplying medium or instrumentality whereby rotative movement of the actuator 60 is multiplied to the ratchet disc 92. Where the diameter of the ratchet disc 92 is approximately three times the pitch diameter of the pinion 90, the peripheral movement or travel of the teeth 94 will be about three times the arcuate travel of the teeth 84 on the actuator 60. If the ratio of the diameter of disc 92 to the pitch diameter of the pinion 90 is increased or decreased, the arcuate travel of the ratchet teeth 94 will be proportionally increased or decreased.

Welded or otherwise secured to the body or web 46 of the support means is a cylindrical tubular member 100, shown in FIGURE 4. Member 100 accommodates a rivet or stub shaft 102. Pivotally mounted on the stub shaft 102 is a locking detent or pawl member 104 having an edge or pawl tooth 106 arranged for cooperation with the ratchet teeth 94 of the ratchet disc 92. The pawl or locking detent is of U-shaped cross-section, as shown in FIGURE 9, providing parallel wall portions 108 and 109. The wall portions are fashioned with openings 110 to accommodate the rivet 102, the pawl being mounted for pivotal movement on the rivet 102.

Also pivoted upon the rivet 102 is a pawl release arm or member 114. The wall 109 of the pawl is fashioned with an extension 116 disposed contiguous with the arm 114. The arm 114 is provided with a slot 118, the elongated walls of which are generated as radii about the center of the rivet 102.

The extension 116 of the pawl or locking detent 104 is fashioned with an opening 120 which registers with the slot 118. Extending through the opening 120 and the slot 118 is a headed rivet 122 which is press fitted into the opening 120 in the pawl extension 116.

The head of the rivet 102 is spaced from the arm 114 to provide sufficient clearance to accommodate pivotal movement of the arm 114 relative to the pawl 104 to an extent permitted by the length of the slot 118. The extension 116 of the pawl 104 is fashioned with a projection 126 having an opening 127 accommodating a hook portion at one end of a contractible coil spring 129, the other end of the spring being engaged with an anchor pin 131 press fitted into a bore in the headed end 76 of the pin 70. The contractile spring 129 biases the pawl in a clockwise direction about the axis of the stub shaft 102 to engage the pawl tooth or detent 106 with teeth 94 of a ratchet disc 92.

The arm 114 serves as means for manipulating the pawl or detent 104 to disengage the pawl tooth 106 with the teeth 94 of the disc 92 to effect a release of the actuator 60 and parking brakes of the vehicle. The arm 114 is fashioned with a handle portion 133 equipped with a hand grip 134 whereby the operator may manually release the pawl 106 from ratchet teeth 94 by movement of member 114 in a counterclockwise direction, as viewed in FIGURES 1, 2 and 5, to release the brake actuator.

The pawl release arm or member 114 may be actuated by power means. A servo-motor 138 of a vacuum-actuated diaphragm type of conventional construction may be utilized as a power means for actuating the arm 114. The housing section 140 of the servo-motor 138 is fashioned with an ear portion 142 which is secured to the body 46 of the support means 44 by a screw 144, as shown in FIGURES 2 and 5. Disposed in the housing section 140 is a flexible diaphragm 146 to which is connected a rod or link 148, the end of the link exterior of the housing section having a hook portion 149 engaged in an opening in an end region of the manipulating arm 114, as shown in FIGURES 2 and 3.

The chamber provided by the housing section 152 at the opposite side of the diaphragm 146 is adapted to be connected by a hose or tubular means 154 with a source of subatmospheric fluid pressure, such as a vacuum line connection with the intake manifold of an engine, through a valve mechanism (not shown) of conventional construction controlled by the gear selector member for the transmission to render the vacuum or reduced pressure effective to move the diaphragm when the gear selector is moved to an operative or power transmission position. The diaphragm 146 is normally biased by coil spring 155 to its normal position shown in FIGURE 2.

When the diaphragm 146 has been moved by the subatmospheric pressure in a left-hand direction, the arm 114, through engagement of the rivet 122 with an end wall of the slot 118, has actuated the pawl means 104 to disengage the pawl tooth 106 from an adjacent tooth 94 in the ratchet disc 92, as shown in FIGURE 5. In the position of the components shown in FIGURE 5, the actuator 60 is released from brake-setting position and, under the influence of the brake springs, is returned to its initial brake release position shown in FIGURE 2.

Through the lost motion connection provided by the pin or rivet 122 and the slot 118, the pawl tooth 106 is enabled to ride over the teeth 94 of the disc 92 as the actuator 60 is moved to brake-setting position without effecting relative movement of the manipulating arm 114 or the diaphragm 146 and link 148 of the servo-motor or power means 138, as the pin 122 is merely reciprocated in the slot 118 as the pawl 106 successively overrides teeth 94 of the disc 92.

The support means 44 is provided with a rivet 158 which supports an abutment or buffer member 160 of semi-hard rubber or the like which is engaged by the flange 66 of the lever portion 65 when the actuator or lever 60 is in its initial brake release position, as shown in FIGURE 2. The buffer 160 cushions the impact of the automatic return of the brake actuator 60 to its initial position upon release of the disc 92 by disengagement of the pawl tooth 106 from the teeth 94.

The pinion component 90 and the ratchet disc 92 are preferably fabricated in the manner illustrated in FIGURES 6, 7 and 8. In fashioning the pinion component 90, a slug or disc of metal such as soft steel is "cold-coined" in suitable dies under high pressure to form the configuration shown in FIGURES 6 and 7. In the "cold-coining" operation, the teeth 90 are cold molded as determined by the shape of the molding die with a comparatively thin web 165 forming the base of the teeth of pinion 90.

Also formed during the "cold-coining" operation is a tenon portion 167 of the configuration, shown in FIGURES 6 and 7, the periphery of the tenon 167 being fashioned with a series of recesses 169 and intermediate apexes 170, as shown in FIGURE 6. A correspondingly shaped opening is punched in the ratchet disc 92, the tenon 167 pressed into the opening, and the edge of the tenon swaged as at 172 over the adjacent surface of the ratchet disc 92 to secure the pinion 90 and disc 92 in fixed relation. In the embodiment illustrated in FIGURES 6 through 8, there are twelve teeth in the pinion 90 and an equal number of apexes 170 on the tenon 167.

As indicated at the fragmentary section portion of FIGURE 6, each tooth of the pinion tooth 90 is in radial alignment with an adjacent recess 169 of the tenon portion 167. The purpose of this orientation is to facilitate "cold flow" of the metal of the slug in forming the pinion portion 90 and the tenon portion 167.

Through the above-described method, the pinion 90 and the ratchet disc 92 may be economically manufactured and integrated into a single component at a low cost and without any waste of metal.

The arrangement of the invention has several novel and distinct advantages over prior constructions. By multiplying the rotative movement of the ratchet disc 92 as compared with the angular or pivotal movement of the actuator 60, the teeth 94 of the ratchet disc 92 may be spaced apart sufficiently to accommodate the pawl tooth 106 and minimize wear of the ratchet teeth and pawl and provide for line incremental holding or locking positions of the brake actuator. As the movement of the ratchet disc 92 is greatly amplified as compared with the movement of the brake actuator 60, the brake actuator may be moved to fully set the brakes and the pawl tooth 106 will engage an adjacent ratchet tooth 94 and hold the brake actuator and the brakes in set position without any cable "back-off."

The force or thrust on the pawl tooth 106 in locking the actuator 60 in brake setting position is reduced in inverse proportion to the amplification of movement of the disc 92 as compared with the movement of the toothed rack portion 83 of the actuator 60. This reduced thrust on the pawl promotes easy withdrawal or release of the pawl tooth 106 from the ratchet teeth 94 by a comparatively small effort or force applied to the member 114. The pawl releasing effort is further reduced for manual release by length of the portion 133 of arm 114 from the pivot axis of the rivet 102.

Furthermore, the reduction in the effort or force required to withdraw the pawl tooth 106 from teeth 94 enables the use of a comparatively small vacuum-operated servo-motor unit 138 as a power release means for the pawl. With applicant's invention the parking brakes are retained in fully set position with a greatly reduced thrust on the locking detent or pawl, the latter being readily disengageable from the ratchet disc 92 by a comparatively small force. Thus, several advantages are derived through the motion multiplying and force reducing instrumentality or media provided by the pinion 90, ratchet disc 92 and the locking pawl 104.

FIGURES 10 and 11 illustrate another form of brake actuating and controlling mechanism embodying the invention. In the form shown in FIGURES 10 and 11, the brakes are actuated to "set" position by a pull rod type of actuator 180. The arrangement includes a housing construction 182 preferably of sheet metal having side walls 184 and 186. The side walls are respectively provided with ear portions 188, one being shown in FIGURE 10, having openings accommodating bolts 192 for securing the housing 182 to a bracket 54' which, in turn, is secured to the instrument panel in the manner illustrated in FIGURE 1.

The bottom wall of the housing adjacent the walls 184 and 186 is fashioned with a ledge portion 194 to provide a support for the pull rod 180. The housing 182 has a tubular extension 196 of rectangular cross-section enclosing the pull rod 180. Welded or otherwise secured to the tubular extension 196 is a bracket 197 having one or more openings 198 to accommodate bolts for fastening the bracket to the firewall, such as the firewall 12 shown in FIGURE 1.

The end of the rod 180 is secured to a flexible cable 200 by staking a tubular end portion of the rod as at 202 into engagement with the brake-operating cable. The cable 200 is connected through a suitable bell crank lever arrangement (not shown) of conventional construction with the parking brakes of the vehicle.

The end of the pull rod 180 adjacent the instrument panel of the vehicle is provided with a hand grip 204 to facilitate manual movement of the pull rod lengthwise in a left-hand direction, as viewed in FIGURE 10 to set the parking brakes. The means for retaining the pull rod 180 in brake setting position is similar to the arrangement hereinbefore described in connection with the brake actuator 60. The walls 184 and 186 are provided with transversely aligned openings accommodating a pin or stub shaft 206.

Journally mounted on the pin 206 is a pinion 90' and a ratchet disc 92' which are secured together in the manner illustrated in FIGURE 7. The pull rod 180 is fashioned with rack teeth 208, the teeth meshing with the teeth of pinion 90'. The walls 184 and 186 of the housing are fashioned with transversely aligned openings accommodating a pin 210. A pawl or locking detent 212 of U-shaped cross-section has openings in its side walls to accommodate the pin 210 whereby the pawl or detent 212 is pivotally mounted upon the pin 210.

The pawl 212 is fashioned with a pawl tooth 214 which is adapted for cooperation with the ratchet teeth 94' of the ratchet disc 92'. A collar or spacer 216 surrounds the pin 210 and maintains the pawl 212 in proper relation with the teeth on the ratchet disc 92'. Surrounding the collar 216 is a coiled torsion spring 218 having one end 220 in hooked engagement with the pawl 212 and the other end 222 in hooked engagement with an upper edge of the housing wall 186. The torsion spring 218 is stressed in a direction to bias the pawl tooth 214 of pawl 212 into cooperative relation with the ratchet teeth 94'.

In this form of the invention, release of the pawl 212 from engagement with the teeth of the ratchet disc 92' is effected by cable means. As shown in FIGURE 10, the upper end of the pawl 212 is provided with an opening accommodating a flexible wire or cable 226, the wire or cable having an abutment or ball 228 secured on the distal end thereof. The cable may extend through an opening in a bracket 230 secured to the instrument panel, such as the instrument panel 14 shown in FIGURE 1. The end portion of the cable adjacent the bracket 230 is equipped with a knob or pull button 232.

In the operation of the arrangement shown in FIGURES 10 and 11, when the operator desires to set the brakes, he grasps the handle 204 and moves the pull rod 180 in a left-hand direction as viewed in FIGURE 10, this action, through the cable 200, setting the vehicle parking brakes.

When the pull rod is moved to brake setting position, the pawl tooth 214, being biased toward the ratchet disc 92' by the torsion spring 218, engages a tooth 94' of the disc and holds the pull rod and the parking brakes in brake-setting position.

To release the parking brakes, the operator grasps the knob 232 and exerts a pulling force on the wire or cable 226 in a left-hand direction as viewed in FIGURE 10, engaging the abutment 228 with the upper end of the pawl 212, the movement of the cable pivoting the pawl 212 abut its axis 210 disengaging the pawl tooth 214 from a tooth 94' on the ratchet disc 92' to release the pull rod 180 for movement to brake-release position. If desired, a servo-motor power unit of the character shown at 138 in FIGURES 1 and 2 may be connected with the flexible cable 226 for releasing the pawl 212 by power means.

The arrangement shown in FIGURES 10 and 11 attains the same advantages as the construction hereinbefore described in the form shown in FIGURES 1 through 9. The pawl force or thrust required to hold a pull rod in brake setting position is reduced through the motion multiplying media provided by the pinion 90' and the ratchet disc 92' and such arrangement likewise reduces the effort or force applied to the wire or cable 226 to withdraw the pawl from engagement with teeth 94' of the disc 92' in releasing the parking brake mechanism.

The amplified rotational movement of the periphery of the disc 92' as compared with the linear movement of the pull rod 180 enables the pawl to cooperate with a tooth 94' to effect a setting of the parking brakes without encountering cable "back-off."

In both forms of the invention there are a minimum number of components embodied in the arrangement which may be economically manufactured commercially.

It is apparent that, within the scope of the invention, modifications and different arrangements may be made other than as herein disclosed, and the present disclosure is illustrative merely, the invention comprehending all variations thereof.

I claim:

1. Mechanism for controlling the parking brakes of a vehicle including, in combination, support means, a brake actuator mounted by the support means for movement relative thereto for setting the parking brakes, a circular member mounted by the support means for rotation about an axis spaced from the actuator, a pinion rotatable with the member, said circular member having ratchet teeth on its periphery and being of a diameter greater than the pitch diameter of said pinion, said brake actuator having teeth enmeshed with the teeth of said pinion, a locking pawl pivotally mounted by the support means and engaged with the ratchet teeth on said circular member for retaining said member in positions to which it is moved by the actuator, and means engaged with the locking pawl for disengaging the pawl from the ratchet teeth of said member to release said actuator to brake release position.

2. Mechanism for controlling the parking brakes of a vehicle including, in combination, support means, a foot-operated brake-actuating lever fulcrumed on the support means for movement relative thereto for setting the parking brakes, a circular element mounted by the support means for rotation about an axis spaced from said lever, a pinion rotatable with the element, said element having ratchet teeth on its periphery and of a diameter greater than the pitch diameter of said pinion, said lever having teeth enmeshed with the teeth of said pinion, a locking pawl pivotally mounted by the support means, means normally biasing the pawl in engagement with the ratchet teeth on said element for retaining the element in positions to which it moved by the lever, and means engaged with the locking pawl for disengaging the pawl from the ratchet teeth on said element to release said lever to brake release position.

3. Mechanism for controlling the parking brakes of a vehicle including, in combination, support means, brake actuating means including a pull rod mounted by the support means for slidable movement relative thereto for setting the parking brakes, said pull rod having rack teeth thereon, an element mounted on the support means for rotation about an axis spaced from the pull rod, a pinion rotatable with the element, said element being of a diameter greater than the pitch diameter of said pinion and having a plurality of ratchet teeth on its periphery, the rack teeth on said pull rod being enmeshed with the teeth of said pinion, a locking pawl pivotally mounted by the support means and engaged with the ratchet teeth on the periphery of said element for retaining said element in positions to which it is moved by the pull rod, and means engaged with the locking pawl for disengaging the pawl from the ratchet teeth on said element to release said pull rod to brake release position.

4. Mechanism for controlling the parking brakes of a vehicle including, in combination, a brake actuator mounted by the support means for movement relative thereto for setting the parking brake, a pinion journally mounted by the support means for rotation about an axis spaced from the actuator, said actuator having teeth enmeshed with the teeth of the pinion, said pinion having a tenon portion of non-circular cross section, a disc-like element having a non-circular opening, the tenon portion of said pinion extending into and snugly fitting the noncircular opening in said element, said element being of a diameter substantially greater than the diameter of said pinion, ratchet teeth formed on the periphery of said element, a locking pawl pivotally mounted by the support means engaged with the ratchet teeth on said element for retaining the element in positions to which it is moved by the actuator, and release means engaged with the locking pawl for disengaging the pawl from the ratchet teeth of said element to release said actuator from brake-setting position.

5. The combination according to claim 4 including resilient means normally biasing the locking pawl into engagement with the ratchet teeth.

6. The combination according to claim 4, including a lost motion connection between the release means and the locking pawl whereby the locking pawl is movable independently of the release means.

7. Mechanism for controlling brakes of a vehicle including, in combination, support means, a brake actuator mounted by the support means for movement relative thereto for setting the vehicle brakes, a first element mounted by the support means for rotation about an axis spaced from the actuator, a second element rotatable with the first element, said first element being of a diameter greater than that of the second element and having a plurality of ratchet teeth aon its periphery, an operative connection between said second element and said actuator whereby relative movement of the actuator effects rotation of said elements, a locking detent mounted by the support means and engaged with the ratchet teeth on the periphery of said first element for retaining said first element in positions to which it is moved by the actuator, and means engaged with the locking detent for disengaging the detent from the periphery of said first element to release said brake actuator and the brakes.

8. Mechanism for controlling parking brakes of a vehicle including, in combination, support means, a brake actuator mounted by the support means for movement relative thereto for setting the parking brakes, an element mounted by the support means for rotation about an axis spaced from the actuator, a pinion rotatable with the element, said element being of a diameter greater than the pitch diameter of said pinion and having a plurality of ratchet teeth on its periphery, said actuator having teeth in enmeshment with the teeth of said pinion whereby movement of the actuator effects rotation of said element, a locking pawl pivotally mounted by the support means and engaged with the ratchet teeth on the periphery of said element for retaining said element in positions to which it is moved by the actuator, and means engaged with the locking pawl for disengaging the pawl from the ratchet teeth on the periphery of said element to release said brake actuator and the brakes.

References Cited

UNITED STATES PATENTS

| | | | |
|---|---|---|---|
| 2,329,859 | 9/1943 | Snell | 74—503 |
| 2,672,061 | 3/1954 | Gardner | 74—530 |
| 3,236,120 | 2/1966 | Fender | 74—531 |

MILTON KAUFMAN, Primary Examiner

U.S. Cl. X.R.

74—503, 530